(12) United States Patent
Engler et al.

(10) Patent No.: US 7,057,599 B2
(45) Date of Patent: Jun. 6, 2006

(54) MICROSTRUCTURES WITH ASSISTING OPTICAL LENSES

(75) Inventors: David A. Engler, Woodbury, MN (US); Rolf W. Biernath, Wyoming, MN (US); John C. Nelson, The Sea Ranch, CA (US)

(73) Assignee: 3M Innovative Properties Company, St. Paul, MN (US)

( * ) Notice: Subject to any disclaimer, the term of this patent is extended or adjusted under 35 U.S.C. 154(b) by 783 days.

(21) Appl. No.: 09/805,990

(22) Filed: Mar. 14, 2001

(65) Prior Publication Data

US 2002/0130831 A1    Sep. 19, 2002

(51) Int. Cl.
  *G09G 3/34*    (2006.01)
(52) U.S. Cl. ...................... 345/107; 359/296
(58) Field of Classification Search ................ 345/107, 345/108, 111, 86, 31, 88, 84, 105; 359/296, 359/117, 298, 623, 634, 637, 435; 264/2.7, 264/1.9, 152, 1.1; 428/212, 323, 403
  See application file for complete search history.

(56) References Cited

U.S. PATENT DOCUMENTS

| 3,612,758 | A | 10/1971 | Evans et al. ............. 178/5.4 R |
|---|---|---|---|
| 4,126,854 | A | 11/1978 | Sheridon .................... 340/373 |
| 4,261,653 | A | 4/1981 | Goodrich ................... 350/362 |
| 4,290,174 | A | 9/1981 | Kalleberg .................... 24/204 |
| 4,438,160 | A | 3/1984 | Ishikawa et al. ............ 427/214 |
| 5,077,870 | A | 1/1992 | Melbye et al. ................ 24/452 |
| 5,201,101 | A | 4/1993 | Rouser et al. ................ 24/575 |
| 5,262,098 | A | 11/1993 | Crowley et al. ............... 264/8 |
| 5,344,594 | A | 9/1994 | Sheridon .................... 264/4.1 |
| 5,389,945 | A | 2/1995 | Sheridon ...................... 345/85 |
| 5,737,115 | A | 4/1998 | Mackinlay et al. ......... 359/296 |
| 5,751,268 | A | 5/1998 | Sheridon .................... 345/107 |
| 5,754,332 | A | 5/1998 | Crowley .................... 359/296 |
| 5,760,761 | A | 6/1998 | Sheridon .................... 345/107 |
| 5,777,782 | A | 7/1998 | Sheridon .................... 359/296 |
| 5,815,306 | A | 9/1998 | Sheridon et al. ............ 359/296 |
| 5,825,529 | A | 10/1998 | Crowley .................... 359/296 |
| 5,917,646 | A * | 6/1999 | Sheridon .................... 359/296 |
| 5,982,346 | A | 11/1999 | Sheridon et al. ............. 345/85 |
| 6,055,091 | A | 4/2000 | Sheridon et al. ............ 359/296 |
| 6,128,124 | A | 10/2000 | Silverman ................... 359/296 |
| 6,222,513 | B1 | 4/2001 | Howard et al. ............... 345/84 |
| 6,348,908 | B1 * | 2/2002 | Richley et al. ............... 345/85 |
| 6,392,786 | B1 | 5/2002 | Albert ........................ 359/296 |
| 6,396,621 | B1 | 5/2002 | Sheridon .................... 359/296 |
| 6,517,618 | B1 * | 2/2003 | Foucher et al. .......... 106/31.16 |

FOREIGN PATENT DOCUMENTS

| EP | 0 902 410 A2 | 9/1998 |
|---|---|---|
| EP | 0 935 230 A2 | 5/1999 |

* cited by examiner

*Primary Examiner*—Reginia Liang
*Assistant Examiner*—Duc Dinh
(74) *Attorney, Agent, or Firm*—Stephen W. Bulkingham (57) ABSTRACT

A microstructure to interact with electromagnetic waves by changing optical aspect in selected areas in response to an external signal, the microstructure comprising: a plurality of responsive elements, each responsive element capable of presenting at least two different optical aspects and changing between the optical aspects based on an applied external signal; a support substrate containing the responsive elements; and a plurality of assisting optical lenses each optically enlarging an image from the responsive elements associated with the assisting optical lens.

25 Claims, 3 Drawing Sheets

MICROSTRUCTURES WITH ASSISTING OPTICAL LENSES

CROSS-REFERENCE TO RELATED APPLICATIONS

None.

BACKGROUND OF THE INVENTION

The present invention relates to microfabricated structures to interact with electromagnetic waves and, more particularly to addressable, reusable visual displays. Still more particularly, an embodiment of the invention relates to preformed microstructured substrates containing assisting optical lenses to enhance the visual effect of visual displays, such as gyricon displays using rotatable particles (e.g., rotary balls).

For purpose of illustration, the present application uses structures of gyricon displays to demonstrate the concepts and the benefits of the inventive structure.

A gyricon display, also called a twisting-particle display, rotary ball display, particle display, dipolar particle light valve, etc., is a type of addressable visual displays. A gyricon display offers a technology for making a form of electric paper and other reflective displays. Briefly, a gyricon display is an addressable display made up of a multiplicity of optically anisotropic particles, with each particle being selectively rotatable to present a desired face to an observer. The rotary particle can be of various shapes, such as spherical or cylindrical. For convenience, balls, rather than cylinders, are used in this description for illustrations.

Addressable visual displays typically have multiple display units such as pixels or subpixels. A separate auxiliary optical element is sometimes used in connection with each display to enhance or create certain visual effects. U.S. Pat. No. 5,777,782 to Sheridon, for example, discloses a gyricon or rotating-particle display having an auxiliary optical structure which is a pre-formed array of lenses indexed to gyricon particles. Although the Sheridon patent relates to gyricon displays only, in principle the use of an auxiliary optical structure is not limited to the gyricon displays. A properly designed auxiliary optical structure may be used to enhance or create certain visual effects in other types of visual displays containing multiple display units, such as displays using the electronic inkbnased on the electrophoretic principle made by E. Ink Corp. For purposes of illustration, however, the present application uses structures of gyricon displays to demonstrate the concepts and the benefits of the inventive structure.

A gyricon display, also called a twisting-particle display, rotary ball display, particle display, dipolar particle light valve, etc., offers a technology for making a form of electric paper and other reflective displays. Briefly, a gyricon display is an addressable display made up of a multiplicity of optically anisotropic particles, with each particle being selectively rotatable to present a desired face to an observer. The rotary particle can be of various shapes, such as spherical or cylindrical. For convenience, balls, rather than cylinders, are used in this description for illustrations. Like ordinary paper, electric paper preferably can be written on and erased, can be read in ambient light, and can retain imposed information in the absence of an electric field or other external retaining force. Also like ordinary paper, electric paper preferably can be made in the form of a lightweight, flexible, durable sheet that can be folded or rolled into tubular form about any axis and can be conveniently placed into a shirt or coat pocket and then later retrieved, restraightened, and read substantially without loss of information. Yet unlike ordinary paper, electric paper preferably can be used to display full-motion and changing images as well as still images and text. Thus, it is particularly useful for bistable displays where real-time imagery is not essential, but also adaptable for use in real-time imaging such as a computer display screen or a television.

In the prior art, the black-and-white balls (particles) are embedded in a sheet of optically transparent material, such as an elastomer sheet. The elastomer sheet is then cured. After curing, the elastomer sheet is placed in a plasticizer liquid, such as a dielectric fluid. The dielectric plasticizer swells the elastomer sheet containing the particles creating cavities larger than the particles around the particles. The cavities are also filled with the absorbed dielectric fluid. The fluid-filled cavities accommodate the particles, one particle per cavity, so as to prevent the particles from migrating within the sheet.

Besides being optically anisotropic, the particles are electrically dipolar in the presence of the fluid. This may be accomplished by simply including in one or both hemispheres materials that impart an electrical anisotropy, or by coating one or both sides of hemispheres with materials that impart electrical anisotropy. The above charge activation agents may impart an electrical anisotropy and an optical anisotropy at the same time. For example, when each hemisphere of a gyricon particle is coated with a material of a distinct electrical characteristic (e.g., Zeta potential with respect to a dielectric fluid) corresponding to a distinct optical characteristic the particles will have an electrical anisotropy in addition to their optical anisotropy when dispersed in a dielectric liquid. It is so because when dispersed in a dielectric liquid the particles acquire an electric charge related to the Zeta potential of their surface coating.

An optically anisotropic particle can be selectively rotated within its respective fluid-filled cavity, for example by application of an electric field, so as to present either its black or white hemisphere to an observer viewing the surface of the sheet. Under the action of an addressing electric field, such as provided by a conventional matrix addressing scheme, selected ones of the optically and electrically anisotropic particles are made to rotate or otherwise shift their orientation within their cavities to provide a display by the selective absorption and reflection of ambient light. Since the particles need only rotate, not translate, to provide an image, much faster imaging response is achieved than with the display of U.S. Pat. No. 3,612,758.

When the electric field is applied to the sheet, the adhesion of each particle to the cavity is overcome and the particles are rotated to point either their black or while hemispheres towards the transparent surface. Even after the electric field is removed, the structures (particles in specific orientations) will stay in position and thus create a bistable display until the particles are dislodged by another electric field. An image is formed by the pattern collectively created by each individual black and while hemisphere. Thus, by the application of an electric field addressable in two dimensions (as by matrix addressing scheme), the black and while sides of the particles can be caused to appear as the image elements (e.g. pixels or subpixels) of a displayed image. These bistable displays are particularly useful for remotely addressable displays that requires little power to switch and no power to maintain the display image for a long period of time (e.g., months).

Gyricon display technology is described further in U.S. Pat. No. 4,126,854 (Sheridon, "Twisting Ball Panel Display") and U.S. Pat. No. 5,389,945 (Sheridon, "writing System Including Paper-Like Digitally Addressed Media and Addressing Device Therefor"). Further advances in black and white gyricon displays have been described in U.S. Pat. No. 6,055,901 (Sheridon, "Twisting-Cylinder Display"). The above-identified patents are all hereby incorporated by reference. The Sheridon patents disclose a gyricon display which uses substantially cylindrical bichromal particles rotatably disposed in a substrate. The twisting cylinder display has ceratin advantages over the rotating ball gyricon because the elements can achieve a much higher packing density. The higher packing density leads to improvements in the brightness of the twisting cylinder display as compared to the rotating ball gyricon.

Gyricon displays are not limited to black and while images, as gyricon and other display mediums are known in the art to have incorporated color. Gyricon displays incorporating color have been described in U.S. Pat. No. 5,760,761 titled "Highlight Color Twisting Ball Display", U.S. Pat. No. 5,751,268 titled "Pseudo-Four Color Twisting Ball Display", U.S. patent application Ser. No. 08/572,820 titled "Additive Color Transmissive Twisting Ball Display", U.S. patent application Ser. No. 08/572,780 titled "Subtractive Color Twisting Ball Display", U.S. Pat. No. 5,737,115 titled "Additive Color Tristate Light Valve Twisting Ball Display", U.S. Pat. No. 6,128,124 titled "Additive Color Electric Paper Without Registration or Alignment of Individual Elements", and European Patent No. EPO902410 titled "Methods for Making Spinnable Ball, Display Medium and Display Device". The above-identified patents are all hereby incorporated by reference.

The above prior art all involve a process which is to randomly pack the bichromal particles in an elastomeric matrix, cure the elastomer, and subsequently swell the elastomer in the dielectric oil. The process is laborious and time-consuming, consisting of mixing of the particles into the elastomer, coating the slurry into a sheet format, curing, and subsequently swelling the sheet with the dielectric oil.

Furthermore, the display device of such an arrangement poses problems in connection with the selection of a usable dielectric liquid, stability upon changes in temperature, non-uniformity of dimensions of the cavities, and the like. The material considerations in the prior art are many, the primary issues being tuning the swelling of the elastomer by the dielectric oil without harming the dielectric oil compatibility with all the other elements of the display package.

Furthermore, the above approach resulted in less than satisfactory contrast of the display, associated with the relatively low reflectance of a gyricon display. It is commonly believed that the best way to improve the reflectance of a gyricon display is to make the display from a close packed arrangement of bichromal particles. The closer packed the arrangement of particles, the better the reflectance and the brighter the appearance of the display. To achieve a close packed arrangement, the cavities in which the particles rotate should be close to each other and each cavity should have little unfilled space when filled with a particle, ideally no more empty space than what is necessary to keep the particle therein rotatable. The prior art approaches, however, had difficulties to achieve a high density of particles, mainly due to the lack of controlling on the formation of individual cavities. The result is typically that cavities are either too large, or distributed too loosely in the elastomer with large distances and thick walls between the individual cavities, making it difficult to control the arrangement and packing density of the display particle members to a sufficiently high value to achieve a display of high quality, high resolution, and high contrast.

As a related problem, in a typical conventional gyricon display, bichromal particles are dispersed throughout the thickness of the substrate sheet, which is always thicker than two particle diameters and is usually many diameters thick. Generally, less than 20 percent of the upper surface area of the sheet is covered by the bichromal particles in the layer closest to the surface. Therefore, a display according to the above prior art has multiple layers of particles instead of a single layer, making the display thick and bulky, an undesirable feature especially for an electronic paper. In the prior art designs, the multiple layer configuration is on one hand necessary in order to increase the reflectance (the reflectance of multiple layers of loosely packed particles accumulatively approaches that of a closely packed single layer) and on the other hand difficult to avoid due to the characteristics of the prior art process of making a display.

To achieve higher packing density, the above method was modified in U.S. Pat. No. 4,438,160 to Ishikawa et al., which patent is hereby incorporated by reference. In the Ishikawa patent, instead of using the swelling method to create cavities larger than the particles, the particles are coated with a layer of wax before being placed in the elastomer. The wax is later melted away, resulting in cavities that are larger than the particles. Presumably, because it is easier to control the thickness of the wax layer coated on the particles than to control the degree of swelling of the elastomer, it is also easier to achieve a higher density of particles by using the Ishilawa method. The actual improvement, however, is not significant enough to solve the problem. See U.S. Pat. No. 5,825,529 to Crowley, which patent is hereby incorporated by reference.

To achieve still higher packing density, a gyricon display can be constructed without elastomer and without cavities. U.S. Pat. No. 5,825,529 to Crowley, for example, uses no elastomer substrate. In the display in the Crowley patent, the bichromal particles are placed directly in the dielectric fluid. The particles and the dielectric fluid are then sandwiched between the two retaining members (e.g., between the addressing electrodes). There is elastomer substrate. Electrodes serve both to address particles and to retain particles and fluid in place. Particles and fluid can be sealed in the display by seals at either end of the display. In addition, the spacing between the electrodes is set to be as close to the diameter of the particle as is possible consistent with proper particle rotation, resulting in a monolayer display. The Crowley patent achieved a display with a closely packed monolayer having a light reflectance that surpasses that of the multi-layer displays in the prior art. The display in Crowley, however, achieves a higher packing density by sacrificing structural integrity. The Crowley display lacks internal support and has insufficient sealing. Particularly, the display will not work when placed vertically.

More fundamentally, even with the above improved methods of making twisting particle displays, the particles cannot be paced together to completely fill the are of the display because of the existence of interstices. Furthermore, regardless of which microstructure is used, and regardless of how the particles are packed, the particles often do not exactly rotate to the precise orientation to have only the side with the desired optical characteristics facing the viewer. Both partial filling and partial rotating contribute to decreased image contrast in the following manner: gyricon displays use optically anisotropic particles that are selectively rotatable to communicate visual information. For example, in a display using bichromal spherical balls where each ball defines a display unit which conveys the characteristic color information of the spherical ball's hemisphere which is selectively turned to face the viewer, the unit display area is typically the projection area or image size of the ball. Due to the unfilled spaces between the particles and also due to the imperfect rotation which may show a wrong color or portions of contrasting (hence canceling) colors, each particle is surrounded by a peripheral area which does not carry any color information of the particle selectively rotated. Instead the peripheral area substantially reflects the optical characteristic of the substrate whish is typically dark. This phenomenon causes decreased contrast. The same phenomenon exists is displays where each unit display is defined by multiple particles.

The auxiliary optical structure in U.S. Pat. No. 5,777,782 to Sheridon is not used to solve the above-identified low contrast problem. Rather, it is used to focus a visual element of gyricon particles to form a projected image on the other side of the transmissive gyricon display. Furthermore, the auxiliary optical structre in that patent is a pre-formed array of fly's-eye lenses which need to be then precisely aligned in each of the x, y, and z directions with the gyricon particles. Such requirement of alignment or indexation between a pre-formed array of lenses and a separately formed gyricon display structure is difficult and costly.

BRIEF SUMMARY OF THE INVENTION

The present invention uses assisting optical elements to enhance or improve optical effect of a microstructure, such as contrast of visual displays (e.g., a gyricon display). To enhance contrast of a visual display, for example, an assisting optical element is placed over or around each display unit to form an enlarged image of at least a portion of the upper side of the display elements (such as the gyricon particles) in that display unit so that the effective unit display area is larger than the actual unit display area, therefore diminishing the effect of imperfect orientation of the display elements and dark peripheral effect caused by the substrate.

The assisting optical elements may be either reflective or refractive. In one preferred embodiment, optical lenses are directly fabricated on the substrate containing the display elements (such as gyricon particles). The lenses form enlarged images of the surface of each particle when viewed from above. The inventive assisting lens structure in accordance with the present invention is not pre-formed separately from the substrate and the display elements. Instead the lenses are formed directly on the substrate corresponding to the geometric shapes and positions of the cavities on the substrate. Because the display elements are contained in the cavities, each lens is "custom-formed" based on the location of the display element or display elements in the associated cavity, and no indexing is required. That is, in contrast to the preformed fly's eye lens structure, the inventive assisting lenses are directly formed on the underlying substrate resulting in automatic indexing or registration between the lenses and the corresponding display units.

BRIEF DESCRIPTION OF THE DRAWINGS

The present invention will be further explained with reference to the drawing figures listed below, wherein like structure is referred to by like numerals throughout the several views.

While the above-identified drawing figures set forth several preferred embodiments of the invention, other embodiments are also contemplated, as noted in the discussion. In all cases, this disclosure presents the present invention by way of representation and not limitation. It should be understood that numerous other modifications and embodiments can be devised by those skilled in the art which fall within the scope and spirit of the principles of this invention.

DETAILED DESCRIPTION

1. General Aspects of the Invention

The invention will now be described with reference to the drawings. For convenience, the drawing depict a reflective gyricon display with each optical element being associated with one spheroidal gyricon particle. The inventive structure in accordance with the present invention, however, may also be used to enhance or create certain optical effects in other types of microstructures. Generally, any microstructure that contains an element having a certain optical aspect by modulating or interacting with an incident electromagnetic wave and giving rise to an identifiable optical effect may use the assistint optical element of the present invention to improve or enhance the optical effect. For example, where elements having optical aspects pertaining to electromagnetic waves other than a visible light are used, the inventive microstructure may be used as a device for optical purposes other than visual displays. Examples for such applications includes, but are not limited to, visual displays using microstructures containing a display element. A display element can be anything that carries certain visual information.

Particularly, the element having an optical aspect may be optically anisotropic (i.e., having two or more optical aspects) and capable of switching among the optical aspects in response to an external signal. The twisting particles or rotating balls used in gyricon displays are examples of such responsive elements having an optical anisotropy.

Visual displays that may use the inventive lens structure typically contain multiple display units, each display unit including one or more responsive elements as display elements. Besides gyricon displays, examples of such visual displays includes, but are not limited to, displays based on the electrophoretic principle such as electronic ink by E Ink Corp.

Furthermore, when used with a gyricon display, the inventive lens structure is not limited to uses with reflective gyricon displays but may also be used with a transmissive gyricon display or a retroreflective gyricon display. In addition, each assisting optical element may be associated with a display unit that consists of multiple gyricon particles, and the particles may be of geometric shapes other than balls. As described in U.S. Pat. Nos. 4,126,854; 5,389,945; 6,055,091; and 6,128,124 and European Patent No. EP0902410, which patents are hereby incorporated herein by reference, when a gyricon display is addressed using electrodes, the display consists of multiple pixels of certain desired density, each pixel being distinguished from other pixels by its addressing. In the case of a color display, each pixel further consists of multiple subpixels (generally three subpixels, each representing an elemental color). Each pixel or subpixel may consist of a single gyricon particle, or multiple gyricon particles. Unless specified otherwise in the context, the present application uses the term "display unit" to present a unit on the display substrate containing a single particle or a group of particles in which group the displays of the particles are addressed in an additive mode (i.e., the display of each particle is designed to be mixed with the displays of the rest of the particles in the same group). Such a group may be a pixel in a black-and-white display, or either a pixel or a subpixel in a color display.

Figure 1A:
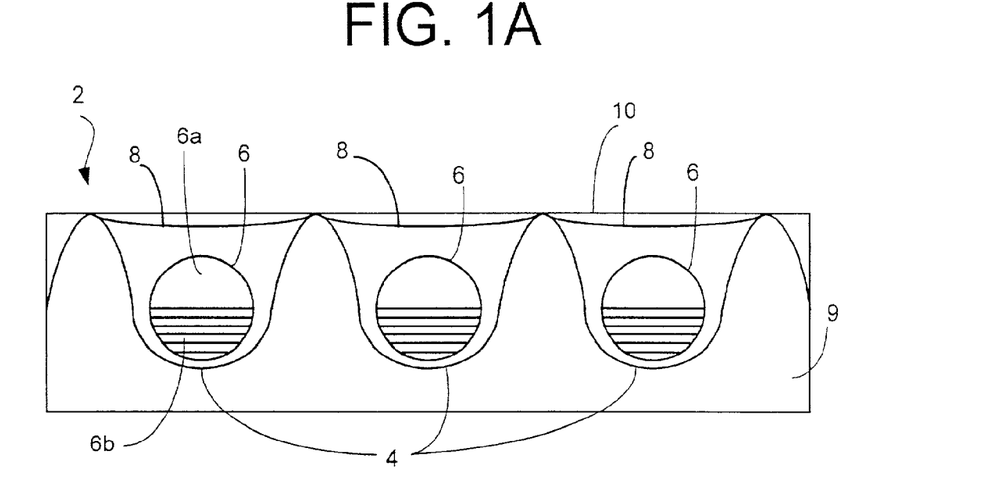
FIG. 1A is a side sectional view of a monolayer black and white gyricon display according to the present invention where the display comprises a plurality of similar or identical display units.

With reference to FIG. 1A, a gyricon display 2 comprises a plurality of repetitive display units 4. Each display unit 4 comprises a gyricon particle 6 (a spherical ball as shown), an optical lens 8, and a portion of substrate 9. Each particle 6 has two optically distinct hemispheres 6a, 6b, one facing the viewer (now shown) positioned above and the other facing away from the viewer.

Figure 1B:
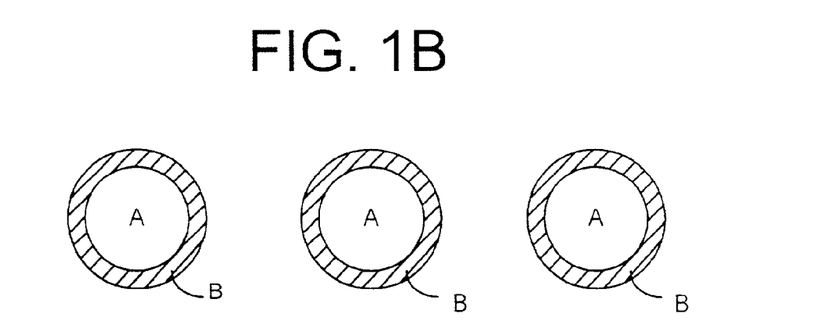
FIG. 1B is a partial top view of the display in FIG. 1.

With reference to FIG. 1B, a viewer from above (now shown) sees a top image of each display unit 4 (shown in FIG. 1A). when an optically anisotropic particle 6 is selectively rotated, the hemisphere facing the viewer has a dominant color. This is often true even if the rotation is imperfect to a certain extent. Without assistance of the optical lens 8 (shown in FIG. 1A), each display unit 6 has an effective display area A which is typically the projection area or image size of the ball. Due to the unfilled spaces between the particles 6 is surrounded by a peripheral area B. Without assistance of an assisting optical element, the peripheral area B does not carry any color information of the particle selectively rotated, instead it reflects the optical characteristic of the substrate which is typically dark. Where the peripheral area B is substantial as compared to display area A, contrast of the display decreases. In addition, incomplete or over rotation also lowers contrast by contributing to area B due to showing portions of contrasting colors instead of a single dominant color.

The optical lens 8 helps to enhance the contrast. With the optical lens 8, the dominant color of the particle hemisphere facing the viewer 6a is spread or diffused into the peripheral area through refraction. As a result, when viewed through the assisting optical element, the viewer sees an image of the display unit 4 larger than the actual size of the particle. The enlarged image has the same dominant color as that of top hemisphere 6a of the corresponding particle and diminishes the image-derogating effect caused by the peripheral area B.

In addition to contrast enhancement, other display qualities such as a wider viewing angle or a wider incident light receiving angle may be achieved by engineering various proper optics.

A description of preferred embodiments according to the spirit of the invention follows.

Figure 2:
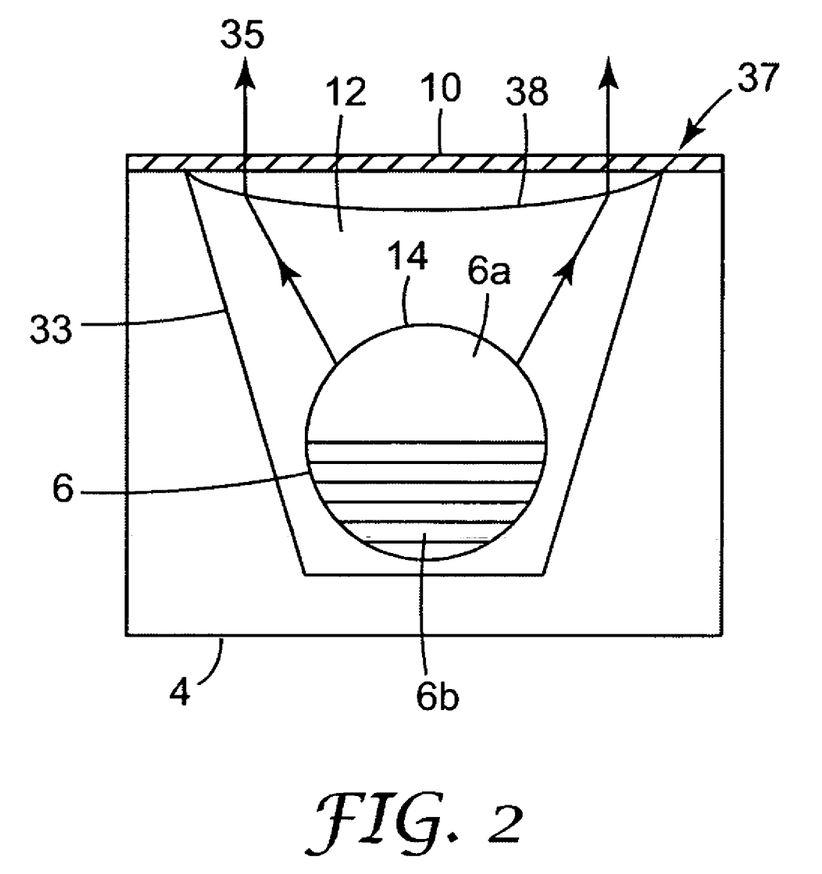
FIG. 2 is a side sectional view of a single display unit in an embodiment according to the present invention where the assisting optical element includes a converging lens.

With reference to FIG. 2, a single display unit 4 in an embodiment according to the present invention includes a converging lens 38 disposed at the top perimeter edge 37 of a cavity 33. The converging lens 38 forms an enlarged image of the upper portion (white hemisphere 6a as shown) of the particle 6 as explained below.

When placed properly in relation to an object, a converging lens may form an enlarged image of the object. When the object is placed within the focus length of the converging lens, for example, the viewer from the other side of the lens will see an enlarged image of the object formed on the same side as the object relative to the lens. With reference to FIG. 2, light 35 from a top portion 14 of particle 6 is refracted through the converging lens 38 before it reaches the viewer from above (not shown). If, for example, the top hemisphere 6a of the particle 6 is located within the focal length of the converging lens 38, an enlarged image of the top hemisphere 6a will be formed on the same side as the particle 6 (i.e., the opposite side to the viewing side) relative to the lens to the viewer from above.

If the enlargement is sufficient to cover a substantial amount of the peripheral area around the particle 6, the contrast of the display will be enhanced. The amount of enlargement, however, should not be excessive. An over-enlarged image starts to blur with the images of adjacent particles 6 and will lead to decreased resolution of display.

The degree of enlargement is determined by the focal length of the converging lens 38 and the distance between the top hemisphere 6a and the lens 38. The maximum amount of enlargement without blurring the display is determined by the size of the peripheral area around each particle 6. to optimize the display 4, it is therefore important to be able to control the focal length of the lenses 38 and the sizes of the cavities 33 in the process of manufacturing the display 4.

In FIG. 2, the converging lens 38 is spaced from the rotating particle 6 and the space therebetween is filled with entrapped air (now shown). Alternatively, a transparent filler material 12 may be used. Besides being an optional support for the lens 38, the filler material 12, when properly selected and applied, helps to create bistability of the gyricon particles 6.

The cavity 33 has a smooth and continuous conical shape. Alternatively, other geometric shapes of the cavity 33, such as the two-portion design in FIG. 2 and FIG. 3 of the commonly-owned U.S. patent application titled "Microstructures with Assisting Optical Elements to Enhance an Optical Effect" and filed concurrently may be used. The disclosure of the above-identified patent application is hereby incorporated herein by reference. Conversely, the assisting optical elements illustrated in that application may also be combined with the converging lens 38 this application. Additionally, the partial enclosing design illustrated in FIG. 3 of that application may also be used in the converging lens model as shown in FIG. 2 in this application.

FIG. 2 illustrates a single display unit 4. the actual visual display comprises a two-dimensional array of such single display units. FIG. 1A, for example, illustrates a partial sectional view of a monolayer black and white gyricon display according to the present invention where the gyricon display 2 comprises a plurality of display units 4. Each display unit 4 has an optical lens 8 on top of a particle 6.

To make a display in accordance with the present invention, a substrate containing cavities that have surfaced openings must first be made. The display in the Crowley patent does not have a substrate containing cavities and is therefore not suitable for implementing the improvement according to the present invention. In addition, the display in the Crowley patent has two other potential problems. First, the display package is environmentally and mechanically sealed only around the perimeter of the display. This results in the package being susceptible to cracking as may result from wear and tear; in this instance, a single crack would be adequate to enable all of the dielectric oil to drain or evaporate away, thereby disabling the function of the display. Additionally, the package is susceptible to buckling, and the elastomer-particle film can sag or slide out of position because of gravity (especially when held vertically for long periods of time, such as for display signs). This is because the mechanical support for the package is primarily the thin polymer films on the front and back sides, and because the reinforcement of these films occurs only where they are bonded together along the periphery.

Elastomer matrix structures in prior art may be used for the purpose of the present invention if the elastomer, with or without the combination of particles, has a surface structure that facilitates lens forming. In most conventional elastomeric structures, however, the cavities and particles are largely enclosed and located inside the elastomer and therefore have no surface openings, making it difficult to fabricate the lens structure of this application. In addition, these elastomer matrix structures have cavities that are randomly formed with irregular shapes and locations. Where each cavity represents a pixel or subpixel, there must be proper indexing or registration in the alignment between the addressing electrodes and each cavity, making the process of adding the auxiliary optical elements difficult and consequently resulting in high costs for making a display. U.S. Pat. No. 5,777,782 to Sheridon is an example for a structure with such limitations.

An exemplary preferred method of making a pre-formed substrate containing cavities is described in detail in the commonly-owned and concurrently filed U.S. patent application titled "Post and Pocket Microstructures for Movable Particles Having an Optical Effect". The disclosure of the above-identified patent application is hereby incorporated by reference.

The concepts and the methods of manufacture disclosed in that application may be used to pre-form a substrate containing cavities that have proper geometric shapes and pattern to accommodate both optically anisotropic particles such as gyricon particles and assisting optical lens. As described in that application, the post and pocket microstructures have many other advantages. Particularly, the pocket and post structure has a surface structure such as the cavities which are open from the top during manufacturing. Such a structure accommodates the process of adding or directly forming an optical lens on the substrate. Additionally, where a dielectric fluid is used, such as in a gyricon display using rotatable particles, the dielectric fluid does not need to diffuse through an elastomer. This allows a much greater variety of dielectric fluids to be used that in the case of the swollen elastomer sheets.

With a preferred pre-formed substrate as discussed above, an assisting optical lens may be included in the following two different ways: 1) pre-forming the assisting optical lens separately (e.g., formed on a top plate that also has the addressing electrodes) and then placing then over the substrate, or 2) forming the assisting optical lens directly or integrally on the elastomer substrate. As used in the present application, a process of "directly forming in assisting optical element on the substrate" means a process that involves more than simple placement of a pre-formed assisting optical element on the substrate or making necessary physical connections between an assisting optical element and the substrate. However, directly forming the lenses on the substrate is preferred for the following reasons: 1) when the pre-formed substrate disclosed in the above identified patent application is used, fabrication of the substrate and fabrication of the assisting optical element (e.g. lens 38) may be made during one single integrated manufacturing process to improve efficiency and lower the cost; and 2) an integrated manufacturing process additionally provides an intrinsic solution to the difficult problem of exact indexing or registration between each lens and its corresponding display unit.

Assisting optical elements other than lenses may also be used to enhance the contrast of a display. For example, as described in detail in the commonly-owned and concurrently filed U.S. patent application titled "Microstructures with Assisting Optical Elements to Enhance an Optical Effect", a reflective corona shouldering a particle creates an appearance that the surface of the particle is larger than the actual size of the surface through reflection of light from the surface, given that the reflective corona is larger than the particle. A reflective corona may simply be made of metalized reflective surfaces, or alternatively formed by using the principle of total internal reflection in which a total reflection is created at an interface of two different materials at certain incident angles of light, even though the interface is not made of a material which is highly reflective in the ordinary sense.

The optical lens structure in accordance with the present invention offers an alternative to the above assisting optical elements. Besides being optically distinctive, the optical lens structure also offers an alternative way of fabricating assisting optical elements on a display. For example, because the lenses are formed subsequent to the placement of the display particles (such as gyricon particles 6) into the substrate, the lenses may be formed directly on top of the display particles, resulting in a lens structure automatically conforming to the geometric shape of the particles, a benefit in addition to the above-discussed automatic indexing.

Converging lenses can be made by conventional methods, such as compression molding. Conventional methods, if used to pre-form the lenses separately, will be less preferable due to the difficulties of registering each lens with a corresponding cavity.

Figure 3:
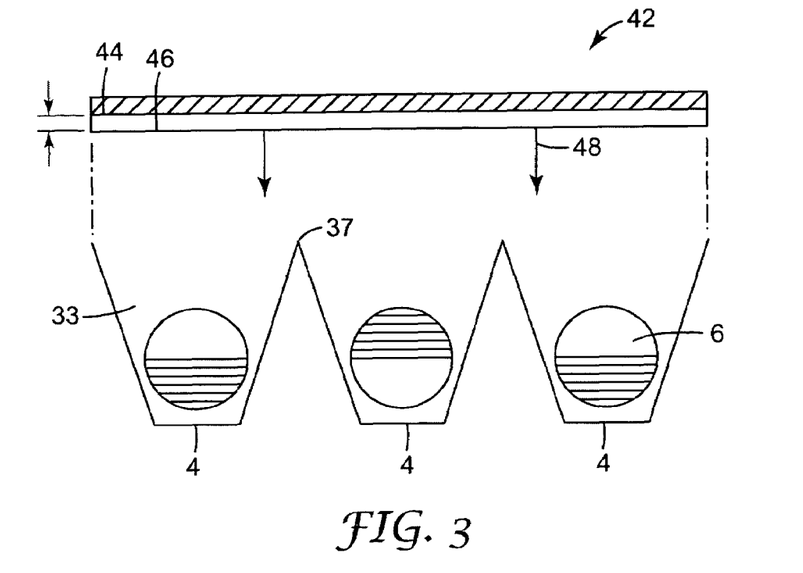
FIG. 3 illustrates a first step used to form the lenses in the embodiment of FIG. 2.
Figure 4:
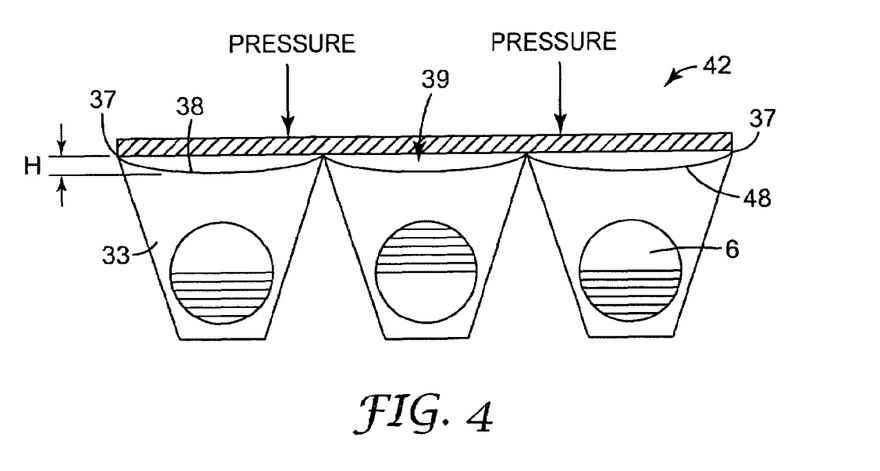
FIG. 4 illustrates a second step used to form the lenses in the embodiment of FIG. 2.

With reference to FIG. 3 and FIG. 4, there is described herein a preferable method of making converging lenses 38 using a self-forming micro-lens array by self-forming microlens film 46. An array of micro-lenslets 38 can be manufactured from transparent thermoplastic polymer which is pressed onto an array of holes (cavities 33 as applied in the present invention).

In FIG. 3, a plate assembly 42 comprises a high temperature backing plate 44, a low temperature lens forming layer 46 and a thin high temperature membrane 48. The backing plate 44 is a rigid material which has a high melting temperature. The low temperature lens forming layer 46 is a polymer which has a low melting temperature such as an ethylene-vinyl acetate copolymer resin (EVA). The thin high temperature membrane 48 is an elastic material which has a high melting temperature such as a polyvinylidene chloride type resin (PVDC). The plate assembly 42 is placed over a two-dimensional array of display units 4.

FIG. 3 and FIG 4 illustrate how a two-dimensional array of micro-lenses 38 is formed from the lens-forming layer 46. In FIG. 3, the plate assembly 42 is placed over a two-dimensional array of display units 4. Heat and pressure are then applied to the plate assembly 42 as shown in FIG. 4. While the high temperature backing plate 44 and the high temperature membrane 48 can withstand the high temperature, essentially all of the lower melt temperature lens-forming material 46 is melted. The pressure deforms the membrane 48 (but does not substantially deform the backing plate 44 as the plate 44 is rigid) and pushes the membrane 48 into the cavities 33. Since the membrane 48 is withheld at top perimeter edges 37 of the cavities 33 but pushed into each cavity 33 in the middle, the membrane 48 is contoured into a spherical surface (lens 38) in each cavity 33. At the same time, the lens-forming material 46 flows in response to both gravity and the pressure exerted by the backing plate 44. The flow of lens-forming material 46, however, is constrained at the bottom by the contoured and strained membrane 48 due to surface tension. The final result is a steady equilibrium state of pressure, forming a spherical lens 38.

Only minimum pressure and temperature is preferred. As the pressure increases, all lens-forming material 46 flows into the cavities 33 and the backing plate 44 will eventually come in contact with the top perimeter edge 37 of the cavities. This condition will prevent further flow of the lens-forming material 46. As a result, further pressure only results in straining the structure and contributes nothing to the lens making.

The temperature should be higher than the melting temperature of the lens-forming material 46 but less than the melting temperature of the back plate 44, the membrane 48, and the substrate 9 (shown in FIG. 1A). A temperature higher than the minimum melting temperature of the lens-forming material 46 will only result in a faster process of equilibrium to a limited degree, and is usually unnecessary or even harmful because too high a temperature may lead to difficulties in operation.

In the above process, the focal length of the lenses 38 is found by the equation $F=(H^2+A^2)/2H$, where H is the thickness of the lens 38 at the center as shown in FIG. 4, while A is the diameter of the top perimeter edge 37 (full view not shown) of the cavity 33. H itself is determined by the total volume V of each lens according to the equation $V=\frac{1}{6}\pi H(3A^2+H^2)$. That is, for a given V and A, the value of H can be readily determined by solving the above equation. If the lens-forming material 46 has a uniform thickness T, each unit cell of the array will have a precise volume V of lens-forming material 46 associated with it. For example, if the top opening of each cavity 33 has an area of $A^2$ (full view not shown), each unit cell will have the volume $V=TA^2$ of lens-forming material 46 associated with it. Therefore, focal length F of the lenses 38 is ultimately determined by T and A and hence easily controlled.

As applied to the present invention, the uniformity of the focal length is not crucial as long as each lens has a sufficient enlarging effect. The actual range of focal length of the lenses 38, however, is significant and must be controllable in the process of manufacturing because a proper range is determined according to the size of the cavities 33 so that the converging lenses 38 have enough enlarging effect to increase the contrast yet do not over-enlarge to cause blurring and hence decrease the resolution.

Once the lens array is formed, the backing plate 44 may be separated from the array of cavities 33 or may remain adhered. The lens array may also be separated from the array of cavities 33 and used for other purposes. In the present invention, however, the lens array and the array of cavities 33 are kept together, resulting in intrinsic registration.

Although the present invention has been described with reference to preferred embodiments, workers skilled in the art will recognize that changes may be made in form and detail without departing from the spirit and scope of invention. All U.S. patents referred in this disclosure are incorporated by reference herein.

The invention claimed is:

1. A visual display to interact with electromagnetic waves by changing optical aspect in selected areas in response to an external signal, the visual display comprising:

a plurality of optically anisotropic responsive elements, wherein the responsive elements are optically anisotropic pertaining to a visible light, each responsive element capable of presenting at least two different optical aspects and changing between the optical aspects based on an applied external signal;

a support substrate containing the responsive elements, the support substrate having a surface structure which defines receiving positions for the responsive elements; and an array of transparent lenses, at least a part of each lens being in direct contact with a receiving position on the surface structure of the support substrate such that the receiving position at least in part inherently defines the lens shape and location.

2. The visual display of claim 1, wherein the support substrate has two major sides, one major side being opaque.

3. The visual display of claim 1, wherein the external signal is an electromagnetic field.

4. The visual display of claim 1, wherein the responsive elements are rotating particles.

5. The visual display of claim 4, wherein the particles are spheroid balls.

6. The visual display of claim 1, wherein the support substrate is three-dimensionally micro-fabricated.

7. The visual display of claim 1, wherein each lens is a converging lens.

8. The visual display of claim 7, wherein:

each lens has a focal length and each responsive element has a portion imparting a visual aspect, the portion being substantially positioned within the focal length from the associated lens.

9. The visual display of claim 1, wherein:

each lens has a perimeter edge, the edge being in direct contact with a top perimeter edge of the associated receiving position.

10. The visual display of claim 1, wherein:

the lens array is formed using a lens-forming film laid across the support substrate after the responsive elements are placed into the support substrate.

11. The visual display of claim 10, wherein the lens-forming film fluidly directly seals the responsive elements within the substrate.

12. The visual display of claim 1, wherein each lens enlarges an image of at least a portion of the responsive element or elements positioned below the lens by refracting the light reflected therefrom.

13. The visual display of claim 1, wherein each receiving position contains only one responsive element.

14. The visual display of claim 1, further comprising a filler material at least partially surrounding each responsive element.

15. The visual display of claim 14, wherein:

the filler material exerts a force on the responsive elements, the force being sufficient to keep the responsive elements bistable but not excessive as to prevent the responsive elements from rotating upon the application of an electromagnetic field.

16. The visual display of claim 1, further comprising a top cover laid across the support substrate and the responsive element contained therein, the top cover being transparent and non-reflective.

17. The visual display of claim 2, wherein the opaque side of the support substrate comprises an opaque cover plate bonded to the rest of the support substrate.

18. A visual display to interact with electromagnetic waves by changing optical aspect in selected areas in response to an external signal, the structure comprising:
- a plurality of optically anisotropic responsive elements, each responsive element capable of presenting at least two different optical aspects and changing between the optical aspects based on an applied external source;
- a support substrate containing the responsive elements, the support substrate having a surface structure which defines receiving positions for the responsive elements; and
- an array of transparent lenses at least a part of each lens being in direct contact with a receiving position on the surface structure of the support substrate such that the receiving position at least in part inherently defines the lens shape and location;
- wherein the support substrate has two major sides, one major side being opaque.

19. The visual display of claim 18, wherein the opaque side of the support substrate comprises an opaque cover plate bonded to the rest of the support substrate.

20. The visual display of claim 18, wherein the responsive elements are rotating particles.

21. The visual display of claim 18, wherein each lens is a converging lens.

22. The visual display of claim 21, wherein:
each lens has a focal length and each responsive element has a portion imparting a visual aspect, the portion being substantially positioned within the focal length from the associated lens.

23. The visual display of claim 18, wherein:
each lens has a perimeter edge, the edge being in direct contact with a top perimeter edge of the associated receiving position.

24. The visual display of claim 18, wherein:
the lens array is formed using a lens-forming film laid across the substrate after the responsive elements are placed into the support substrate.

25. The visual display of claim 18, wherein each lens enlarges an image of at least a portion of the responsive element or elements positioned below the lens by refracting light reflected therefrom.

* * * * *

UNITED STATES PATENT AND TRADEMARK OFFICE
CERTIFICATE OF CORRECTION

PATENT NO. : 7,057,599 B2  Page 1 of 2
APPLICATION NO. : 09/805990
DATED : June 6, 2006
INVENTOR(S) : David A. Engler It is certified that error appears in the above-identified patent and that said Letters Patent is hereby corrected as shown below:

Title Page
Col. 2, line 18 (U.S. PATENT DOCUMENTS), after "6,517,618" delete "B1" and insert - - B2 - -, therefor.

Column 1
Line 46, delete "inkbnased and insert - - ink based - -, therefor.

Column 3
Line 12, delete "ceratin" and insert - - certain - -, therefor.

Column 4
Line 58, delete "are" and insert - - area - -, therefor.

Column 5
Line 22, delete "structre" and insert - - structure - -, therefor.
Line 57 (APPROXIMATELY), delete "preformed" and insert - - pre-formed - -, therefor.

Column 6
Line 36, delete "assistint" and insert - - assisting - -, therefor.
Line 42, delete "includes," and insert - - include, - -, therefor.
Line 55, delete "includes," and insert - - include, - -, therefor.

Column 7
Line 26, delete "when" and insert - - When - -, therefor.
Line 57, below "follows." insert --2. Preferred Embodiments - -.
(As a new paragraph)

Column 8
Line 22, after "6." delete "to" and insert - - To - -, therefor.
Line 38, after "concurrently" insert - - (Attorney Docket Number M507.12-16) - -.

Column 8
Line 46, delete "the" and insert - - The - -, therefor.

Column 9
Line 29 (APPROXIMATELY), delete "Effect"." and insert - - Effect" (Attorney Docket Number M507.12-14). - -, therefor.

UNITED STATES PATENT AND TRADEMARK OFFICE
CERTIFICATE OF CORRECTION

PATENT NO. : 7,057,599 B2
APPLICATION NO. : 09/805990
DATED : June 6, 2006
INVENTOR(S) : David A. Engler

It is certified that error appears in the above-identified patent and that said Letters Patent is hereby corrected as shown below:

Column 10
Line 8, delete "Effect"," and insert - - Effect" (Attorney Docket Number M507.12-14), - -, therefor.

Column 12
Line 25 (APPROXIMATELY), in Claim 6, delete "micro-fabricated." and insert - - micro fabricated. - -, therefor.

Signed and Sealed this

Twenty-eighth Day of November, 2006

JON W. DUDAS
*Director of the United States Patent and Trademark Office*